United States Patent
Wootten (10) Patent No.: US 10,900,539 B2
(45) Date of Patent: Jan. 26, 2021

(54) FLUID DAMPER HAVING A DAMPING PROFILE FAVORABLE FOR ABSORBING THE FULL RANGE OF COMPRESSION FORCES, INCLUDING LOW- AND HIGH-SPEED COMPRESSION FORCES

(71) Applicant: Fox Factory, Inc., Watsonville, CA (US)

(72) Inventor: Dennis K. Wootten, Scotts Valley, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

(21) Appl. No.: 14/509,992

(22) Filed: Oct. 8, 2014

(65) Prior Publication Data

US 2015/0021131 A1    Jan. 22, 2015

Related U.S. Application Data

(63) Continuation of application No. 11/617,713, filed on Dec. 28, 2006, now abandoned.

(60) Provisional application No. 60/755,123, filed on Dec. 30, 2005.

(51) Int. Cl.
*F16F 9/34* (2006.01)
*F16F 9/512* (2006.01)
*F16F 9/348* (2006.01)

(52) U.S. Cl.
CPC ............. *F16F 9/512* (2013.01); *F16F 9/348* (2013.01)

(58) Field of Classification Search
CPC .. F16F 9/34; F16F 9/348; F16F 9/3488; F16F 9/48; F16F 9/512; F16F 9/516
USPC ... 188/280, 322.13, 322.15, 313, 317, 266.1
See application file for complete search history.

(56) References Cited

U.S. PATENT DOCUMENTS

| | | | |
|---|---|---|---|
| 2,565,617 A | 8/1951 | Mercier Jacques et al. |
| 3,592,164 A | 7/1971 | Schultze |
| 3,690,413 A | 9/1972 | Airheart |
| 3,698,521 A | 10/1972 | Paul |
| 3,751,020 A | 8/1973 | Kendall et al. |
| 3,865,356 A | 2/1975 | Wossner |
| 4,036,319 A | 7/1977 | Andre |
| 4,325,468 A | 4/1982 | Siorek |
| 4,515,253 A | 5/1985 | Itoh |
| 4,582,343 A | 4/1986 | Waugh |
| 4,679,811 A | 7/1987 | Shuler |
| 4,711,435 A | 12/1987 | Harris et al. |
| 4,744,444 A | 5/1988 | Gillingham |

(Continued)

OTHER PUBLICATIONS

"Damper Fundamentals", Weitzehof Racing Enterprises, Mar. 2003.

(Continued)

*Primary Examiner* — Bradley T King (57) ABSTRACT

A fluid damper is provided that has a compression damping profile that is favorable for damping the full range of compression forces, including low- and high-speed compression forces. While achieving this compression damping profile, the damper has a mode that does not require: (1) both low- and high-speed compression circuits; (2) the rider or a complicated control system to make adjustments to the compression circuit to achieve the different compression damping curves/profiles; and/or (3) the use of an inertia valve. The damping curve should be at least non-increasing and may be regressive across substantially the entire high-speed operating range of the damper.

2 Claims, 10 Drawing Sheets

(56) References Cited

U.S. PATENT DOCUMENTS

| | | |
|---|---|---|
| 4,958,706 A | 9/1990 | Richardson et al. |
| 5,154,263 A | 10/1992 | Lizell |
| 5,186,481 A | 2/1993 | Turner |
| 5,210,382 A | 5/1993 | Paley et al. |
| 5,328,005 A | 7/1994 | Van Breemen |
| 5,405,159 A | 4/1995 | Klein et al. |
| 5,456,480 A | 10/1995 | Turner et al. |
| 5,501,242 A | 3/1996 | Coutts et al. |
| 5,533,596 A | 7/1996 | Patzenhauer et al. |
| 5,586,780 A | 12/1996 | Klein et al. |
| 5,921,360 A | 7/1999 | Moradmand |
| 5,937,976 A | 8/1999 | Grundei |
| 5,971,116 A | 10/1999 | Franklin |
| 6,026,939 A | 2/2000 | Girvin et al. |
| 6,105,987 A | 8/2000 | Turner |
| 6,120,049 A | 9/2000 | Gonzalez et al. |
| 6,135,434 A | 10/2000 | Marking |
| 6,202,981 B1 | 3/2001 | Davis et al. |
| 6,213,263 B1 | 4/2001 | De Frenne |
| 6,217,049 B1 | 4/2001 | Becker |
| 6,244,398 B1 | 6/2001 | Girvin et al. |
| 6,260,678 B1 | 7/2001 | Moradmand et al. |
| 6,267,400 B1 | 7/2001 | McAndrews |
| 6,311,962 B1 | 11/2001 | Marking |
| 6,318,523 B1 | 11/2001 | Moradmand et al. |
| 6,360,857 B1 | 3/2002 | Fox et al. |
| 6,371,264 B1 | 4/2002 | Deferme |
| 6,382,370 B1 | 5/2002 | Girvin |
| 6,540,052 B2 | 4/2003 | Fenn et al. |
| 6,581,948 B2 | 6/2003 | Fox |
| 6,592,136 B2 | 7/2003 | Becker et al. |
| 6,604,751 B2 | 7/2003 | Fox |
| 6,659,239 B2 | 12/2003 | Van Wonderen et al. |
| 6,705,813 B2 | 3/2004 | Schwab |
| 6,883,652 B2 | 4/2005 | Deferme |
| 6,899,207 B2 | 5/2005 | Deferme et al. |
| 7,070,029 B2 | 7/2006 | Deferme |
| 2001/0023801 A1 | 9/2001 | Fenn et al. |
| 2001/0032763 A1 | 10/2001 | Naples et al. |
| 2003/0051957 A1 | 3/2003 | Lemieux |
| 2003/0213662 A1* | 11/2003 | Fox ............... B62K 25/04 188/275 |
| 2005/0056505 A1* | 3/2005 | Deferme ......... F16F 9/3485 188/322.15 |
| 2005/0067240 A1 | 3/2005 | Holiviers et al. |
| 2005/0104320 A1 | 5/2005 | Wesling et al. |
| 2005/0167940 A1 | 8/2005 | Sirven |
| 2005/0173213 A1 | 8/2005 | Coquet |
| 2006/0243548 A1 | 11/2006 | Stein et al. |

OTHER PUBLICATIONS

"Handbook of Spring Design", 1991, 38.
"Inside: Ohlins TT44 Manual", 1999, pp. 8-13, 17-18, 21-22, 43-50.
"Koni Series 2822 Damper", 2 Pages.
"Penske Piston Selection and Damping Curve Charts", 2001, 12 Pages.
"U.S. Appl. No. 11/567,074", filed Dec. 5, 2006.
"U.S. Appl. No. 11/617,713", filed Dec. 28, 2006.

* cited by examiner

FIG 1A
(PRIOR ART)

Linear (C)
Linear (R)

FIG 1B
(PRIOR ART)

High Flow Linear (C)
Linear (R)

FIG 1C
(PRIOR ART)

Digressive (C)
Linear (R)

FIG 1D
(PRIOR ART)

Digressive (C)
Digressive (R)

FIG 1E
(PRIOR ART)

Velocity Dependent (C)
Velocity Dependent (R)

FIG 1F
(PRIOR ART)

Regressive (C)

FIG 7 see Handbook of Spring Design (SMI 1991), p. 38

PRIOR ART

FLUID DAMPER HAVING A DAMPING PROFILE FAVORABLE FOR ABSORBING THE FULL RANGE OF COMPRESSION FORCES, INCLUDING LOW- AND HIGH-SPEED COMPRESSION FORCES

CROSS-REFERENCE TO RELATED APPLICATIONS

This application is a continuation of and claims the benefit of co-pending U.S. patent application Ser. No. 11/617,713, filed on Dec. 28, 2006, entitled "FLUID DAMPER HAVING A DAMPING PROFILE FAVORABLE FOR ABSORBING THE FULL RANGE OF COMPRESSION FORCES, INCLUDING LOW- AND HIGH-SPEED COMPRESSION FORCES" by Dennis K. Wootten., assigned to the assignee of the present application, and is hereby incorporated by reference in its entirety herein.

The application with Ser. No. 11/617,713 claims the benefit of and claims priority of U.S. provisional patent application Ser. No. 60/755,123, filed on Dec. 30, 2005, by Dennis K. Wootten, is hereby incorporated by reference in its entirety herein.

FIELD OF THE INVENTION

The invention is generally directed to the field of fluid dampers. The invention is more specifically directed to the field of fluid dampers for use with bicycles and/or applications where the damper will be subjected to the full range of compression forces, including low- and high-speed compression forces. All patents and published applications referred to herein are incorporated by reference in their entirety into this patent application.

BACKGROUND OF THE INVENTION

Because the description of the present invention makes repeated reference to compression damping curves (sometimes referred to as compression damping profiles) for fluid dampers (herein referred to as dampers), some background on damping curves is provided. Force verses velocity (F-v) diagrams are the commonly used graphical form to illustrate damper characteristics. FIGS. 1A-F depict various prior art F-v diagrams for various types of compression (C) and rebound (R) circuits having various underlying hydraulic structures. However, as the present invention is primarily directed to compression damping, all references to damping herein should be construed to mean compression damping, unless otherwise specified, and with the general understanding that the invention may be used with rebound damping circuits.

The compression damping profile of a damper, as measured by a dynamometer, at some particular damper set-up/tuning will typically be an overall or composite damping profile. In other words, this overall damping profile generally represents the combination of the individual compression damping profiles of the two or more elements that restrict compression flows of different speeds inside the damper. These elements may be in series, parallel or a combination of both and are typically referred to as circuits.

Figure 2:
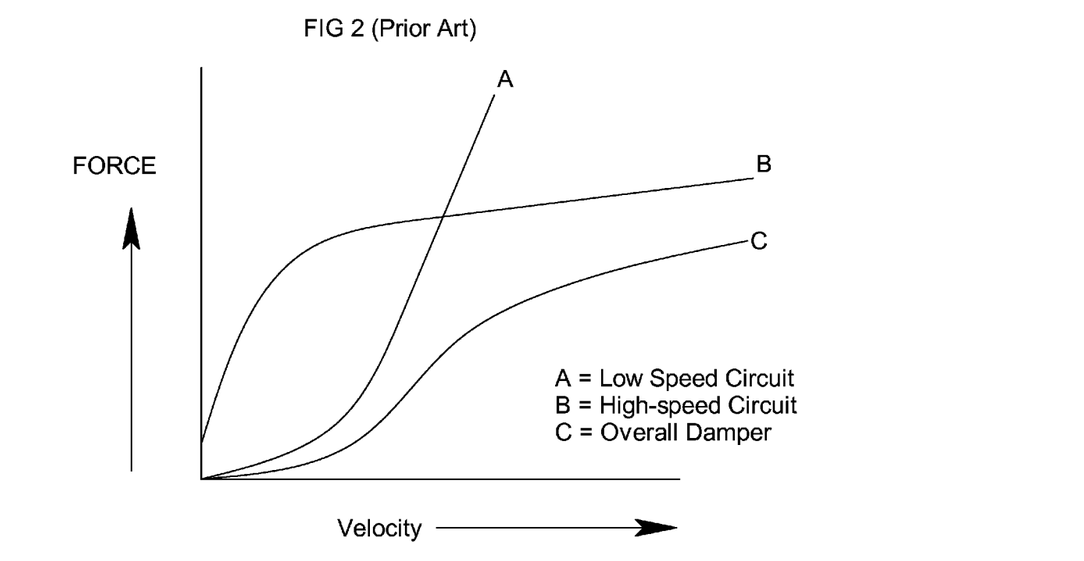
FIG. 2 depicts an exemplary prior art damping curve for a damper and for the individual compression damping valves of the damper.

FIG. 2 depicts exemplary damping profiles over an operating range of shaft speeds (referred to as velocities in F-v diagrams). As shown in FIG. 2, a damper may have an overall compression damping profile C that is the combination of the individual damping curve A of a low-speed compression circuit, typically in the form of an orifice and the individual damping curve B of a high-speed compression circuit, typically in the form of a spring-controlled valve. Having multiple compression damping circuits in a damper can be necessary because a single compression damping circuit will typically be unable to produce a damping profile favorable for absorbing the full range of compression forces, including low- and high-speed compression forces, unless the single circuit is adjustable (see below). As also shown in FIG. 2, in a typical prior art damper, the overall compression damping forces increase as the shaft speed increases.

As used herein and would be recognized by those skilled in the art, "speed" refers to, for example, the speed of the damper's main shaft when the bicycle and therefore the shaft are subjected to the impact of a compressive force, such as but not limited to a terrain feature. The damper's main shaft may sometimes be referred to as the piston rod by those skilled in the art. For a bicycle damper, the normal operating range for main shaft speeds may be, for example, from 0 inches/second to 100 inches/second or more. Additionally, for clarity, as used herein, "compression forces" are the forces created by the impact of the bicycle with, for example, a terrain feature. "Compression damping forces" are the forces created by the damper to slow the speed at which the damper actually compresses when subjected to the compression force. Compression damping forces are created by the compression damping circuits restricting fluid flow.

As mentioned above, in the field of dampers, it is desirable for the damper to have an overall compression damping profile favorable for damping the full range of compressive forces, including low- and high-speed compression forces.

For example, in a bicycle damper, it is generally preferable to have the damper produce significant low-speed compression damping for when the bicycle is being pedaled over flat ground to minimize energy loss due to pedal bob and provide the rider with improved pedaling efficiency. Pedal bob is a well-known phenomenon that occurs at low shaft speeds (in the range of approximately 0-10 inches/second) when a rider is aggressively pedaling in a standing position ("out of the saddle"), but pedal bob can also occur during seated pedaling. Pedal bob is discussed to varying degrees in, at least, for example, the following US patents:

| U.S. Pat. No. | U.S. Pat. No. | U.S. Pat. No. |
| --- | --- | --- |
| 4,582,343 | 6,026,939 | 6,267,400 |
| U.S. Pat. No. | U.S. Pat. No. | U.S. Pat. No. |
| 4,679,811 | 6,105,987 | 6,382,370 |
| U.S. Pat. No. | U.S. Pat. No. | U.S. Pat. No. |
| 5,186,481 | 6,120,049 | 6,581,948 |
| U.S. Pat. No. | U.S. Pat. No. | U.S. Pat. No. |
| 5,405,159 | 6,217,049 | 6,592,136 |
| U.S. Pat. No. | U.S. Pat. No. | U.S. Pat. No. |
| 5,586,780 | 6,244,398 | 6,604,751 |

On the other hand, it is also sometimes preferable to have the same damper produce less (or at least not increasing) compression damping in the high-speed range when the bicycle is being subjected to large irregular bumps (generally high-speed phenomenon) to provide the rider with a smoother ride.

A single compression valve or compression circuit having a fixed damping curve cannot typically produce an overall damping profile that is favorable across the full range of compression forces, including low- and high-speed compression forces.

Therefore, according to the prior art, for a damper to produce an overall damping curve favorable across the full range of compression forces, the damper will typically have been provided with either: (1) both multiple compression circuits, each optimized fir a particular range of shaft speeds, e.g., low-speed, id-speed, and high-speed; (2) the need for a rider or a complicated control system to make adjustments to the compression circuit to achieve the different compression damping curves-profiles; and/or (3) an inertia valve.

For example, in Fox Factory, Inc.'s, U.S. Pat. No. 6,592,136, a front suspension fork is provided with a number of compression circuits that combine to make a front suspension fork favorable for damping the full range of compression forces from low- to high-speed. The various compression circuits may be manually adjusted by a rider using knobs positioned external of the suspension fork to allow the damper to more favorably damp different speed compression forces.

In Fox Factory, Inc.'s U.S. Pat. No. 6,360,857 a rear shock absorber is provided with a compression circuit that may be manually adjusted by a rider using a controller positioned external of the shock absorber. In manually adjustable dampers such as these, when the compression circuit adjustment is made, the damper's overall compression damping curve will be changed from, for example, a compression damping curve/profile favorable for damping low-speed compression forces to a compression damping curve/profile favorable for damping high-speed compression forces.

However, it is desirable for the rider to not have to make manual adjustments to the compression circuit during a ride to change the overall damping profile of the damper from one favorable compression damping profile to another as riding conditions change. Therefore, for example, as described in Fox Factory, Inc.'s U.S. Pat. No. 6,581,948 and U.S. Pat. No. 6,604,751, a fluid damper may be provided with an inertia valve (IV) that automatically adjusts the amount of compression damping based upon the upward acceleration imparted on the damper. Thus, at low upward accelerations, the IV produces one compression damping profile and at high upward accelerations the IV produces a different compression damping profile. Pedal bob is typically a low acceleration phenomenon and therefore, the compression profile produced by low accelerations can be favorable to low-speed compression force situations, such as pedal bob.

In other instances, as in U.S. Pat. No. 5,971,116, the different compression damping profiles are only achieved by using a complex electronic control system and a motor-controlled valve. Finally, in U.S. Pat. No. 4,325,468, a suspension control valve is described that produces a damping profile favorable for absorbing both low- and high-speed compression forces. However, the tow- and high-speed compression forces are absorbed by the combined effects of different springs or spring groups. In particular, a firm coil spring dominates damping of high-speed forces and a group of softer Belleville-type springs dominate damping of low-speed forces. One structure, e.g., spring or family of similar springs, does not create a damping profile favorable for absorbing both low- and high-speed compression forces.

The present invention is directed to a fluid damper having a compression damping profile that is favorable for absorbing the full range of compression speeds, including low- and high-speed compressions, but does not require: (1) multiple compression circuits; (2) the rider or a complicated control system to make adjustments to the compression circuit to achieve the different compression damping curves/profiles; and/or (3) the use of an inertia valve. Furthermore, the compression damping profile resulting from the exemplary embodiments of the invention may be regressive across the entire high-speed operating range of the damper.

DETAILED DESCRIPTION OF THE DRAWINGS

The present invention is generally directed to a damper using a very simple structure for producing compression damping forces and varies the amount of applied compression damping in response to the shaft speed. In particular, the invention may be directed to a damper that produces less or at least not increasing) compression damping as the shaft speed increases and across substantially the entire mid to high-speed operating range of the damper.

Figure 3:
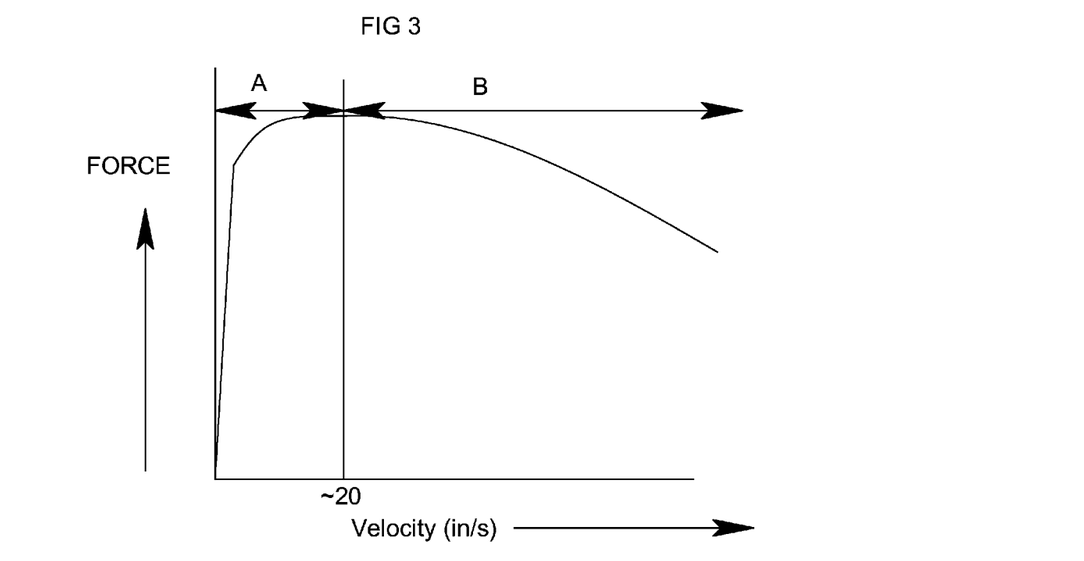
FIG. 3 depicts an advantageous overall damping curve for use in a bicycle damper.

These concepts are graphically shown in FIG. 3, which depicts an advantageous overall compression damping curve for use in a bicycle damper wherein different and distinct damping profiles occur at different shaft speed ranges across the operating range of the damper. As previously mentioned, for a bicycle damper, the operating range of the damper may be, for example, from 0 inches/second to 100 inches/second or more. Advantageously, according to the exemplary embodiment of the invention, this overall compression damping curve can also be achieved using a single compression circuit.

As an example, region A shows typical compression forces produced by the current invention in the low-speed range of the overall damping profile of a bicycle shock. As shown in this example, the low-speed range may extend from shaft speeds of zero up to about 20 inches/second. This includes pedal bob velocities that typically range up to about 5-10 inches/second.

It is typically preferable to maintain pedaling efficiency over the ability of the damper to absorb low-speed compression forces. Therefore, usually in this low shaft-speed range, a high and preferably the highest, amount of compression damping is desired to stiffen the bicycle suspension so that the pedal bob induced shaft forces do not result in significant damper compression. Accordingly, as shown in FIG. 3, within this pedaling region, the amount of compression damping provided by the damper will typically be at or near its maximum/highest levels.

In region B of the damping curve of FIG. 3, piston shaft movement is much faster than that resulting from, for example pedal bob, and results primarily from bicycle tire impact with large terrain features, such as but not limited to large bumps, curbs, or landings from jumps. Pedaling efficiency is not an issue in the high-speed range. Therefore, usually in this high-speed range, less compression damping is desired to soften the bicycle suspension so that the terrain feature induced shaft movements do result in damper compression. Accordingly, as shown in FIG. 3, in region B of the compression damping curve, the amount of compression damping provided by the damper is not greater than and preferably less than that of region A. Additionally, since compression damping of conventional dampers typically increases with increasing shaft speeds, it would also be preferable to have a damper wherein after a certain shaft speed threshold is reached, the compression damping force no longer increases and preferably decreases as the shaft speed increases (i.e., faster fluid flows) over substantially the entire ordinary operating range of the damper. Therefore, as shown in the compression damping profile depicted in FIG. 3, the damper may produce a non-increasing and actually decreasing compression damping force as the shaft speed increases so that the terrain feature is more smoothly and easily traversed by the vehicle, with reduced impact forces. Preferably, the compression damping curve does not ever transition from decreasing to increasing during the ordinary and typical operating range of the damper.

To date, in the field of fluid dampers, there have been no dampers able to reproduce, for example, the entire curve of FIG. 3 using a very simple damping mechanism or that did not require the user or the shock (via a control system) make valving adjustments or spring replacements. For example, in FIG. 7A of U.S. Pat. No. 5,971,116, a compression damping profile similar to that of FIG. 3 herein is shown. However, the compression damping profile of U.S. Pat. No. 5,971,116 is only achieved by using a complex electronic control system and a motor-controlled valve. Finally, as previously mentioned. U.S. Pat. No. 4,325,468 achieves a compression damping curve having a portion similar to that of FIG. 3 herein. However, in the '468 patent, the overall compression damping curve is achieved using a combination of different spring groups and a bypass passage and the damper does not produce less (or at least not increasing) compression damping across substantially the entire high-speed operating range of the damper.

The current invention, on the other hand, can produce the damping curve of FIG. 3 and can do so using a very simple structure that relies primarily on the spring curve and pre-load of a single or spring group associated with a single compression circuit to produce the desired overall compression damping profile.

Figure 4:
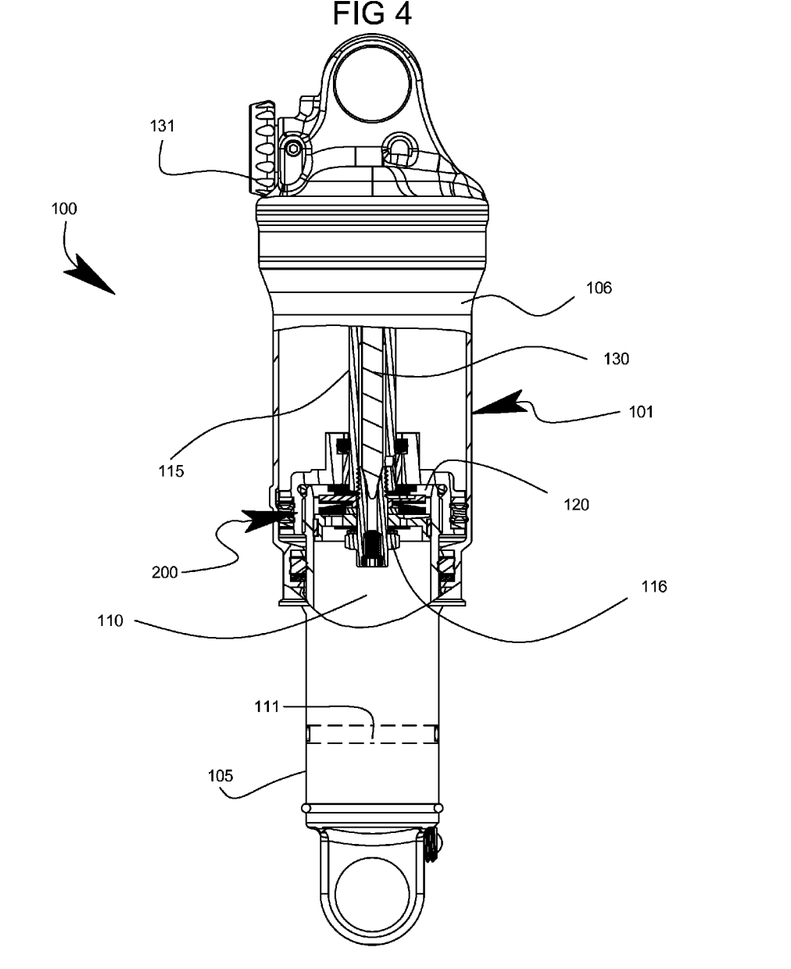
FIG. 4 depicts an exemplary damper incorporating the teachings of an exemplary embodiment of the invention.
Figure 5A:
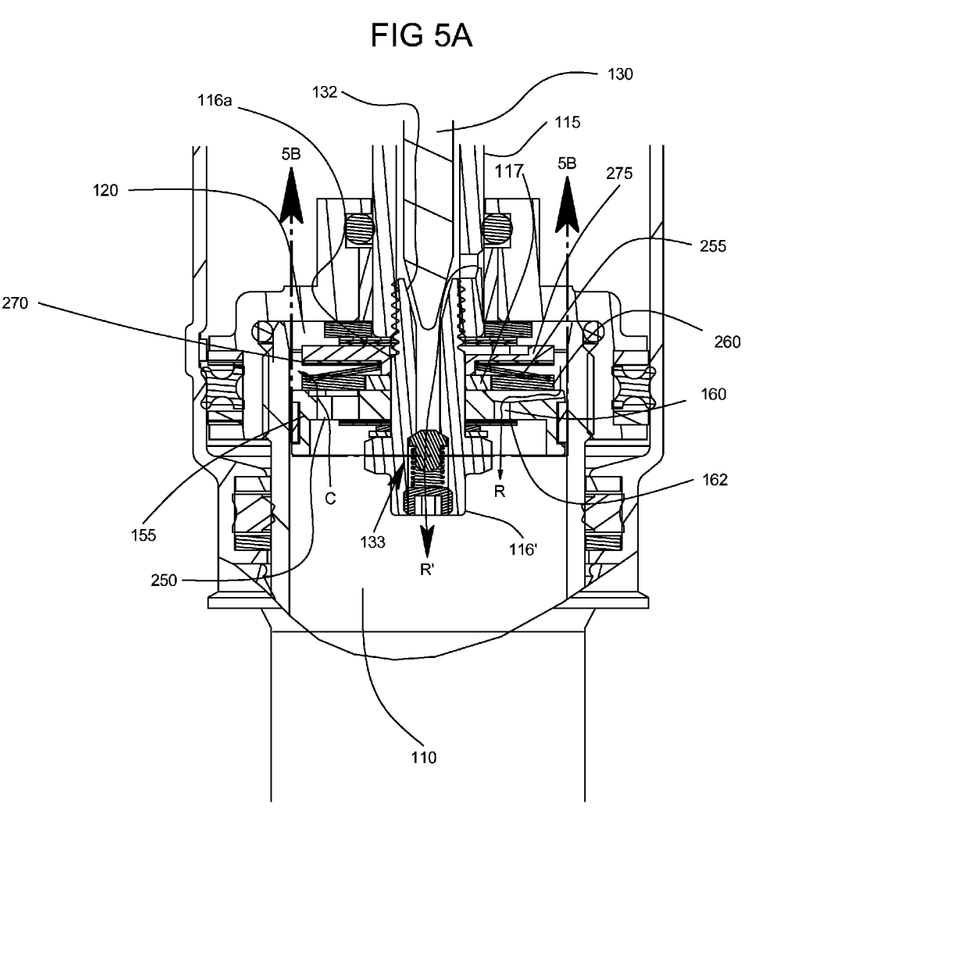
FIG. 5A is a detailed view of valving for use with the teachings of an exemplary embodiment of the invention.

A fluid damper incorporating an exemplary form of the invention and in the form of a shock absorber is generally depicted in FIG. 4 and the details of the compression damping valve of an exemplary form of the invention are depicted in FIG. 5A. As shown in FIG. 4, damper 100 comprises a damper housing 101 having a first telescoping tube 105 and a second telescoping tube 106 in sealed engagement with each other. Second telescoping tube 106 may be in the form of an air cylinder when damper 100 is in the form of a shock absorber having an air spring. Shock absorbers having air springs are shown, for example, in U.S. Pat. No. 6,135,434; U.S. Pat. No. 6,311,962; and U.S. Pat. No. 6,360,857, all of which are assigned to the present assignee.

As shown in more detail in FIG. 5A, hollow shaft 115 spans at least a portion of the interior of the damper housing and a partition, shown in the exemplary embodiment in the form of a piston mounted on and for movement with shaft 115 via bolt 116 having a bolt head 116', separates the volume inside telescoping tube 105 into a first variable volume fluid chamber 110 and a second variable volume fluid chamber 120. As described in our '434, '962, and '857 patents and known to those skilled in the art, first variable volume fluid chamber 110 may include an gas-backed internal floating piston 111 (shown in shadow). Partition 155 will have at least one flow port 160 selectively closed off by a check valve 162 for only allowing fluid flow from the second chamber 120 to the first chamber 110 through rebound flow path R during an expansion (rebound) of damper 100 (see arrow R in FIG. 5A). Flow port 160 may sometimes be referred to as a rebound port and check valve 162 may sometimes be referred to as a rebound valve. An adjustable rebound damping control shaft 130 spans the hollow center of shaft 115, as described in our '857 patent. Knob 131 (FIG. 4) is used to alter the position of shaft 130 relative to seat 132 to control the amount of fluid flow through spring-loaded rebound bypass check-valve 133 and rebound bypass flow path R' (see arrow in FIG. 5A).

Figure 5B:
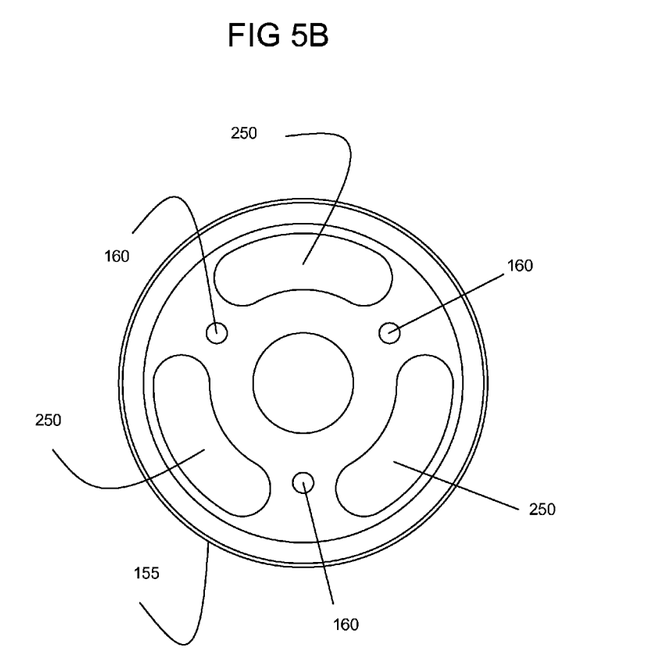
FIG. 5B is a plan view of a partition for use with the teachings on an exemplary embodiment of the invention and looking in the direction of line 5B-5B of FIG. 5A, FIG. 6A and FIG. 6B depict an exemplary Belleville spring that can be used with the teachings of an exemplary embodiment of the invention.

As previously mentioned, the invention is primarily directed to compression damping in a damper. Accordingly, a flow control valve 200 (see generally FIG. 4), that may be referred to as a compression circuit or compression valve 200 is provided. As shown in FIG. 5A, valve 200 comprises at least one flow path, generally in the form of a flow port 250 is provided for creating a path for substantially all fluid flow from the first chamber 110 to the second chamber 120 (see arrow C) during a contraction (compression) of damper 100 caused by, for example, a compression force being imparted on the damper 100. As shown in FIG. 5B, preferably, the at least one flow port 250 will comprise a plurality of, and preferably three, flow ports 250 that substantially surround (encircle) shaft 115 and are suitably sized to accommodate the fluid flow rates through partition 155 associated with high shaft speeds. The kidney-shaped flow port structure depicted in FIG. 5B will provide a maximum flow rate while still retaining the structural integrity of partition 155. As shown in FIG. 5A, cylindrical valve plate 260 floats on bolt shank 116a and is used to selectively close off flow port 250. In particular, valve plate 260 may move towards and away from partition 155 by moving up and down spacer 117 to either block (prevent fluid flow) or unblock (allow fluid flow) flow port 250. Note that in situations where a bleed flow (not shown) is also provided between the first and second chambers to create a flow path between the first and second chambers, closing off flow port 250 does not necessarily preclude fluid flow from the first chamber to the second chamber. However, this bleed flow does not detract from the fact that maximum levels of compression damping will typically be created when valve plate 260 is in its blocking position and that valve 200 may create a damping profile favorable to the full range of compression forces.

At least one spring 255 may be associated with the valve 200 and biases valve plate 260 towards a closed position where valve plate 260 blocks flow port 250. In the exemplary embodiment of the invention, as will be described below, the at least one spring includes three substantially identical springs.

Figure 8A:
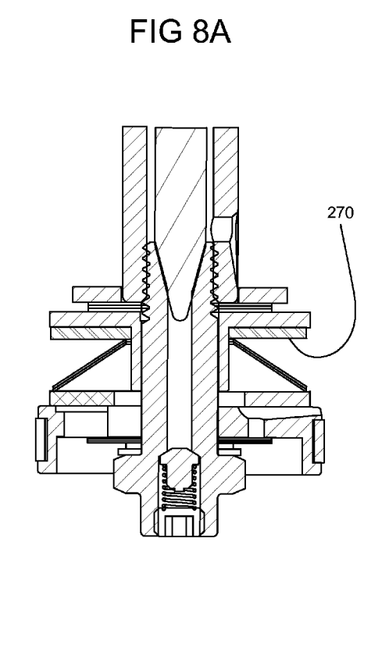
FIG. 8A, FIG. 8B, and FIG. 8C depict various Belleville spring configurations that can be used with the teachings of an exemplary embodiment of the invention.
Figure 8B:
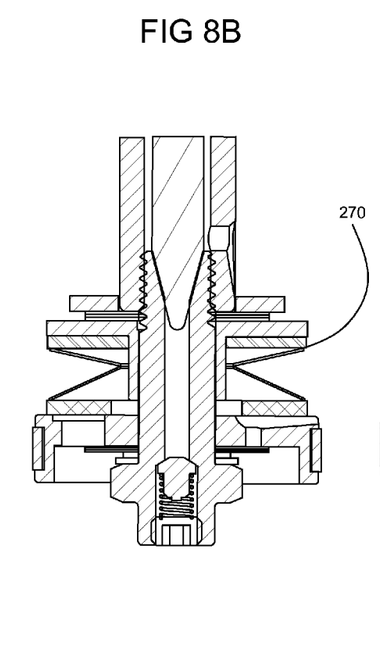
Figure 8C:
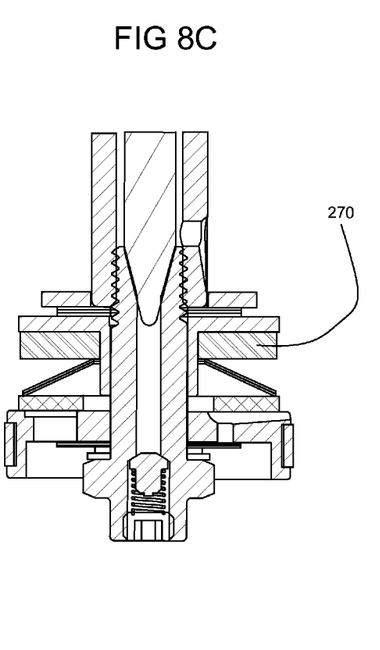

Mounting plate 275 supports spring 255 and typically at least one spacer 270 may apply a pre-load to spring 255 (FIGS. 8A-8C). As will be discussed below, the thickness and/or number of spacers 270 are dependent upon the thickness and/or number of springs 255 and the desired overall compression damping curve for the damper. It is also possible to pre-load spring 255 without the use of a spacer (see FIG. 9A-9B). Mounting plate 275 provides the additional functionality of preventing springs 255, when they are in the form of Belleville springs, from "snapping over".

Figure 6A:
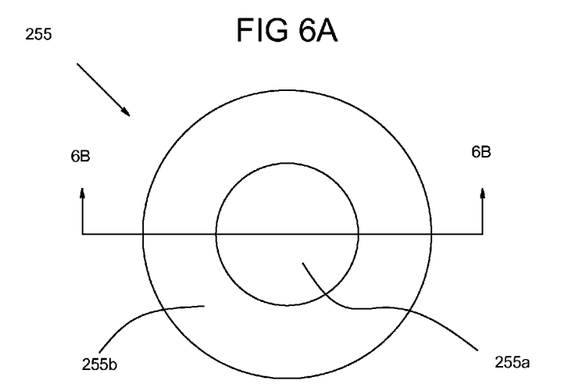
Figure 6B:
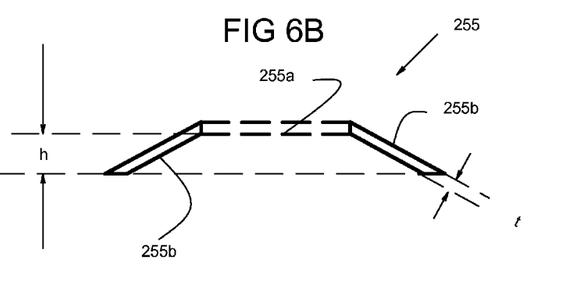

Springs 255 may come in a variety of forms, so long as the selected spring can produce the damping curve shown in FIG. 3 or a very similar damping curve when the spring 255 is incorporated into a damper 100. FIG. 6A and FIG. 6B depict a basic exemplary form of spring 255, which may comprise what it sometimes referred to as a Belleville spring (or washer) by some skilled in the art. In particular, spring 255 may comprise a metallic annular disc with a raised open center 255$a$ and downwardly (with respect to the raised open center 255$a$) sloping sides or rim 255$b$. Sometimes, springs with this general structure are referred to as being conical. See, e.g., U.S. Pat. No. 4,711,435. Springs such as these have typically been used in situations, including in fluid dampers, where decreased spring or stack heights were desired. See, e.g., U.S. Pat. No. 3,592,164; U.S. Pat. No. 5,210,382. A variation on the Belleville design and which may also potentially be used with the invention is disclosed in U.S. Pat. No. 6,705,813. However, while the ultimate dimensions of such a spring will differ from those described below when using a Belleville spring, the dimensions can still be determined using the general guidelines and teachings herein.

Not just any Belleville spring will produce the desired damping curve depicted in FIG. 3 when incorporated into a damper 100.

The spring (load v. deflection) curve of a particular spring 255 with this general structure is dependent upon its construction and in particular its thickness t and available travel h. Available spring travel h equals the difference between the un-sprung height of spring 255 minus the thickness t of spring 255.

Figure 7:
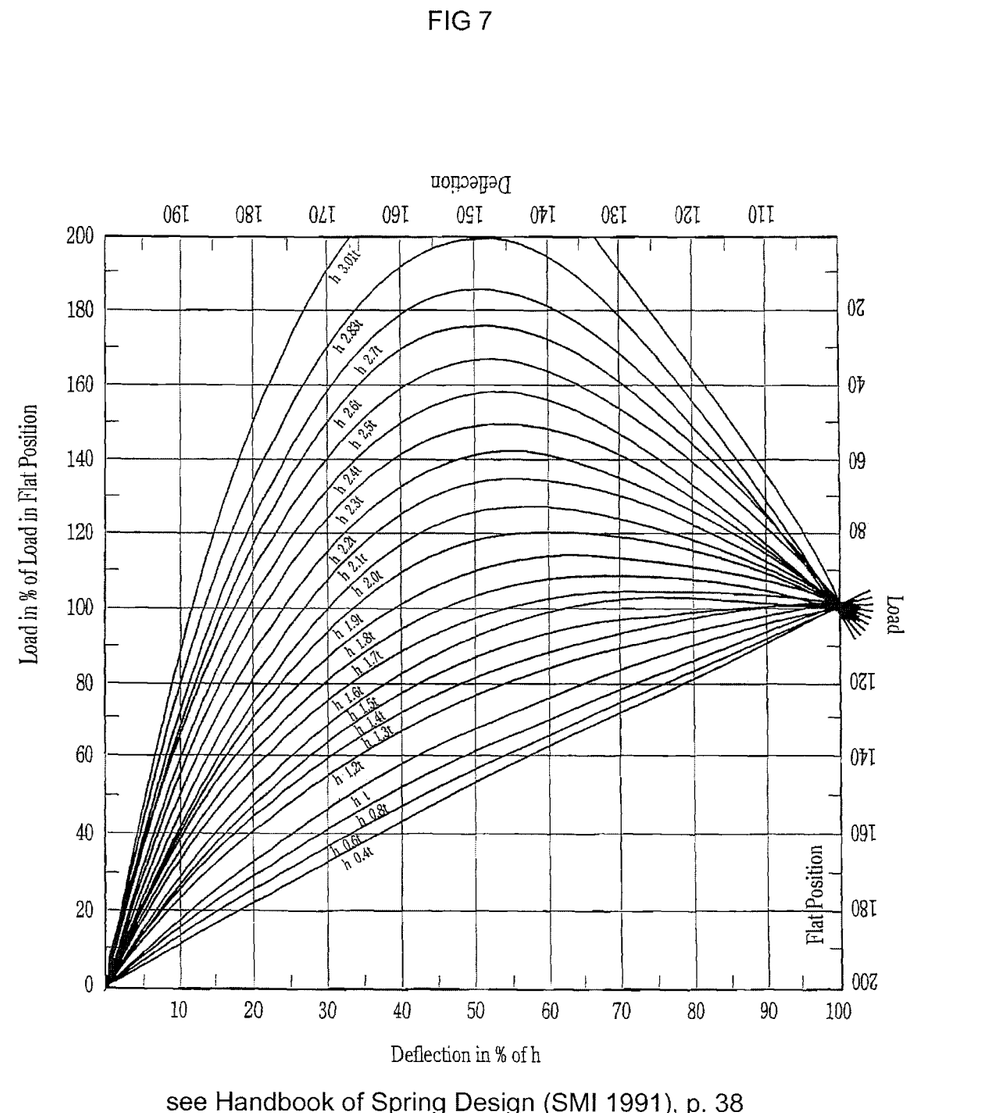
FIG. 7 is a load/deflection chart for various Belleville spring structures.

FIG. 7 depicts spring (load/deflection) curves for various h/t values of a spring 255 and shows that the spring curve of spring 255 is highly dependent upon the ratio of h/t. FIG. 7 is taken from Handbook of Spring Design (Spring Manufacturers Institute 1997) at p. 38. For very small values of this h/t ratio, the spring curve is almost linearly increasing over the entire travel of the spring (from relaxed to flat). For very high values of the h/t ratio, as the spring 255 goes from relaxed to flat, the spring curve rises (positive slope), reaches a plateau, and then decreases (negative slope). Accordingly, when comparing references to springs having this general structure in the prior art, one must be careful to appreciate that structural differences between different springs 255 may result in drastically different spring curves. For example, Belleville springs have been referred to as both creating a constant spring force, see e.g., U.S. Pat. No. 2,565,617; U.S. Pat. No. 3,592,164, and a regressive spring force, see e.g. U.S. Pat. No. 4,325,468; U.S. Pat. No. 5,501,242. However, as shown in FIG. 7 herein, a Belleville spring that creates a constant spring force will have a very different structure from a Belleville spring that produces a regressive spring force. As can be seen in FIG. 7 herein, a Belleville spring that creates a constant spring force has a very specific structure, e.g., h≈1.6t and then only produces such as flat response during a specific portion of its overall travel (i.e., when the amount of deflection exceeds 0.6h). Yet the prior art often does not describe the precise structure of the Belleville spring being used.

Figure 1A:
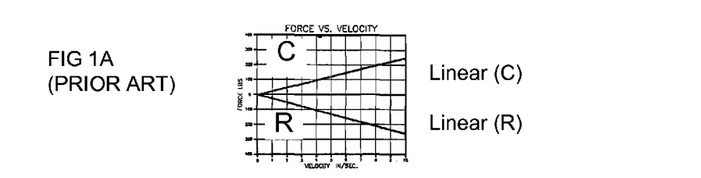
FIG. 1A-F depict various prior art F-v diagrams, also known as damping curves.
Figure 1B:
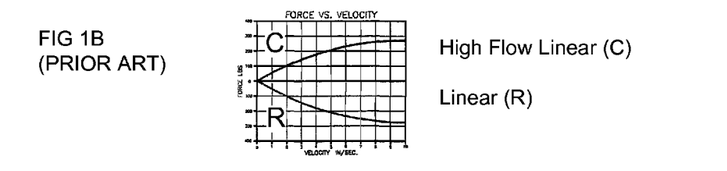
Figure 1C:
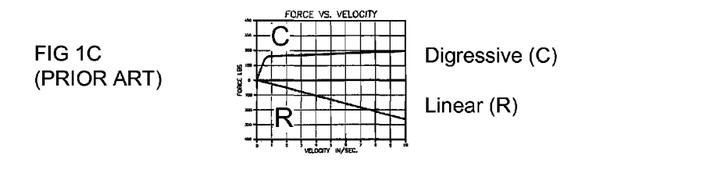
Figure 1D:
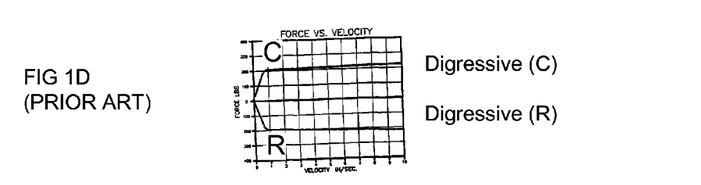
Figure 1E:
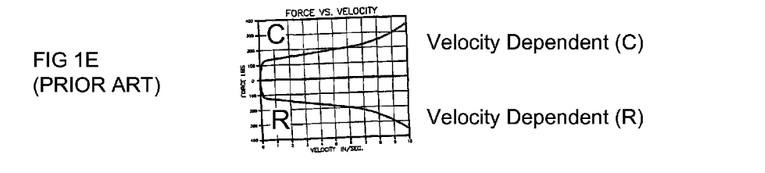
Figure 1F:
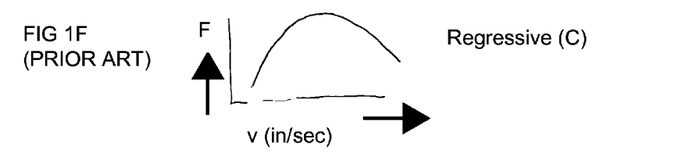

As mentioned above, it is generally preferable to have a bicycle damper produce significant low-speed compression damping for low-speed (e.g. pedal bob) compressions and less compression damping for absorbing high-speed compressions. This damping profile of the current invention may be referred to as a regressive damping profile and differs from a flattened, but still increasing damping profile, which may sometimes be referred to as a digressive damping profile, as exemplified in FIG. 1C, D herein and U.S. Pat. No. 6,318,523.

The invention achieves these two different damping profiles, i.e., regressive overall profile, by using a spring 255 having an h/t ratio that when applied with a specific pre-load produces a damping curve having positively and non-positively sloped portions. For example, h/t≥2 and preferably h/t≈5 will yield such a desired damping curve when spring 255 is incorporated into a damper. Furthermore, spring 255 will be typically pre-loaded (reducing the amount of available travel) to a value where most of the upwardly sloped portion of the spring curve is bypassed during the use of the damper and the maximum levels of compression damping are created in the low-speed operating range. Under these conditions, spring 255 will produce its highest and almost constant compression damping rate for a first range of deflection before beginning to drop off as the shaft speed increases. When the compression damping rate begins to drop off, under preferred ordinary operating conditions, the damping rate should not begin to rise again regardless of shaft speed. Accordingly, the amount of compression damping created at the pre-load point will be the maximum levels of compression damping created by the damper across substantially the entire high-speed operating range of the damper.

As previously mentioned, FIG. 7 is a load/deflection chart for various Belleville spring structures. FIG. 7 is representative of similar charts for Belleville spring structures reproduced in standard mechanical engineering reference texts. As can be seen in FIG. 7, these deflection charts provide incomplete data for h/t of about 3 and provide no data for h/t greater than about 3.0. This suggests that Belleville springs having these structures are not widely used in any art. However, we have determined that such springs, whose properties can be calculated using standard equations, and that push the envelope of Belleville spring technology, have substantial utility.

Pre-loading the spring to a value of approximately 0.5h can be sufficient; even though there is significant room for deviation from this value because desired damper performance can be subject to riding conditions and be very subjective from rider-to-rider and indeed, a rider's own pedaling forces may vary. While deviations from approximately 0.5h of approximately at least ±10% are feasible as a general rule or for general application, individual deviation selections may vary much more widely and for different amounts of deviation on each side of the pre-load value. What is important is that spring 255 be pre-loaded to a value that creates maximum levels of damping forces in the shaft speed range approximately equal to those resulting from pedaling.

Spacer 270 creates the pre-load on the spring 255 and by using one or more spacers 270 (which themselves may come in different thickness—compare FIGS. 8A and 8C), different amounts of pre-load can be created on the spring 255. Finally, multiple springs 255 may be stacked (FIG. 89) or nested (FIGS. 8A, 8C) to allow for higher h/t ratios and again a variety of different spacer 270 combinations can be used to compensate for spring height and desired pre-load (compare FIGS. 8A-8C).

Figure 9A:
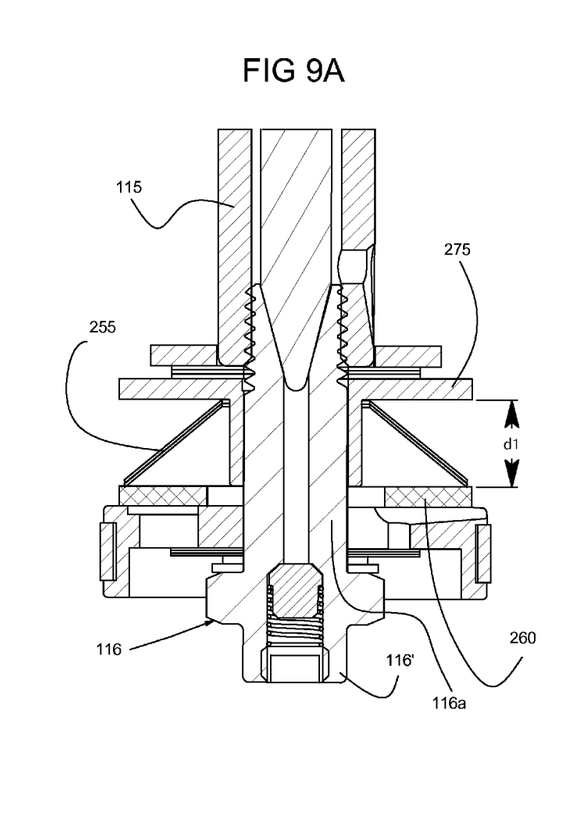
FIG. 9A and FIG. 9B depict various Belleville spring configurations that can be used with the teachings of a second exemplary embodiment of the invention.
Figure 9B:
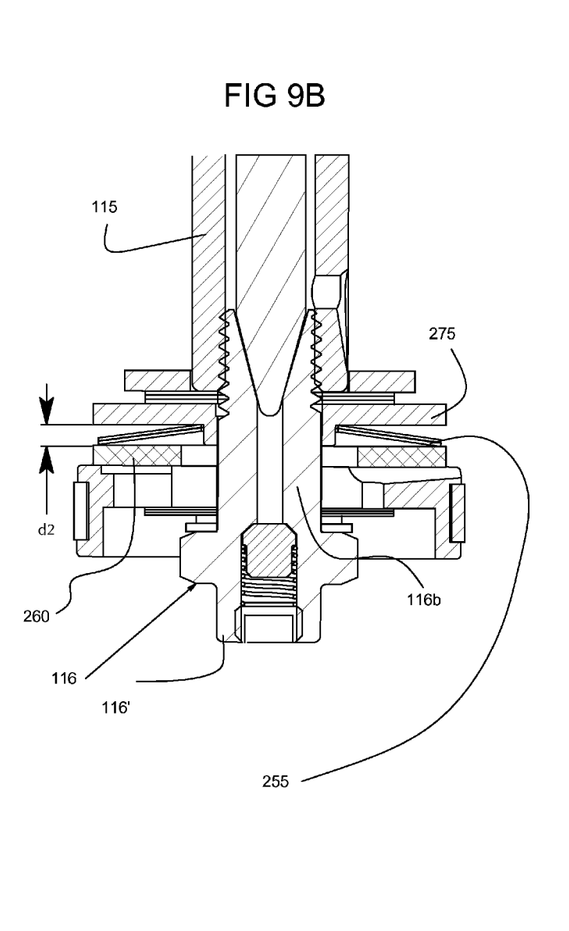

Alternatively, as shown in FIGS. 9A-9B, by varying the size of the shank 116a, 116b of bolt 116, the distances d1, d2 between mounting plate 275 and valve plate 260 can be varied. The magnitude of the size of distance d1, d2 can be used to control the amount of pre-load on spring 255.

Once an h/t that achieves a preferred damping curve is selected, actual values for h and t must be determined.

The value h is selected based upon the flow rate desired through ports 250 because h determines how far valve plate 260 may move away from the partition 155 and unblocks flow ports 250. These conditions determine flow rate.

The value of t is selected based upon the desired stiffness of the damper.

In one actual embodiment of the current invention, sold by Fox Factory as the FLOAT R™ rear shock absorber, it has been determined that for a damper capable of absorbing shaft speeds up to approximately 100 inches/second and having the h/t and pre-load ranges mentioned above, a spring group of three substantially identical springs having h=0.040 inches (relaxed height=0.048 inches and a t=0.008 inches are acceptable with: a valve plate 260 having an outer diameter of approximately 0.850 inches, a first fluid chamber 110 having an inner diameter of 0.940 inches, and a piston shaft having a ⅜ inch diameter. It should be recalled that under these conditions, since spring 255 will be pre-loaded 50%, valve plate 260 will only be able to travel approximately 0.020 inches away from partition 155 to unblock flow port 250. However, flow rates associated with shaft speeds up to 100 inches/second will still be able to flow between the partition 155 and valve plate 260 and allow the damper to operate. Additionally, we have determined through testing that under normal operating conditions over the operating range of damper with such a spring 255, it is highly unlikely that spring 255 will either bottom out or "snap over" and the damping profile will not begin to increase.

Having described the basic theory and structure underlying the invention and an exemplary embodiment of the invention, the operation of a damper incorporating an exemplary embodiment of the invention will now be described.

When the rider is in a typical pedaling cadence, tow-speed compression forces resulting from the pedaling will be imparted on damper 100. However, because the low-speed compression forces will not exceed the damping forces resulting from the pre-selected pre-load on spring 255, the valve plate 260 will continue to be biased towards blocking port 250 and this results in damper 100 producing its maximum levels of compression damping forces. The rider will have maximum pedaling efficiency. Under these general circumstances, the resulting compression damping forces produced by spring 255 will be within a narrow range, be their highest, and correspond to region A of the compression damping curve of FIG. 2. Damper 100 is thus reacting in a way favorable to absorbing low-speed compression forces.

When the rider faces a source of compression, such as a bump or terrain feature, high-speed compression forces result and are transmitted to the shaft 115 of damper 100. These forces will exceed the damping forces resulting from the pre-selected pre-load on spring 255. Thus, spring 255 will begin to respond according to the portion of its damping curve beyond the pre-load value and which corresponds to region B of the compression damping curve depicted in FIG. 3. With the pre-selected h/t ratio (e.g., approximately >2), the compression damping force will remain level or decrease from its maximum levels as the speed of the force imparted on the damper increases. Thus, faster shaft speeds and compression forces may result in less resistance to the damper absorbing the force. In this circumstance, a desirable high-speed response is achieved and damper 100 is thus reacting in a way favorable for damping high-speed events.

Figure 10A:
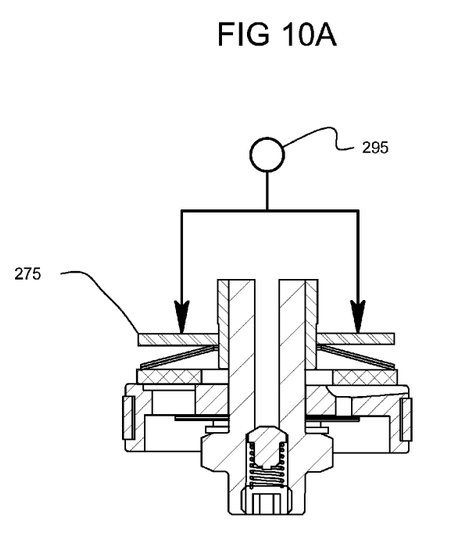
FIG. 10A and FIG. 10B depict an alternative structure for controlling the compression damping rate according to another exemplary embodiment of the invention.
Figure 10B:
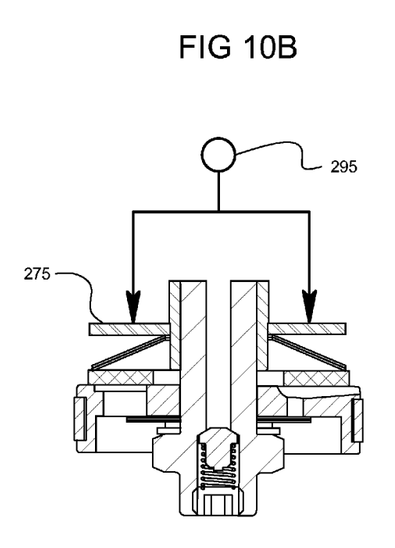

The current invention has been described with reference to a fluid damper whose compression damping profile relies primarily on the spring curve and pre-load of a spring, such as a Belleville spring, associated with a single compression valve. However, the invention is not so limited. For example, as schematically shown in FIG. 10A, FIG. 10B, the damper may include an adjustment mechanism 295 (shown schematically herein), operated by, for example, a knob or lever (neither shown), that allows the rider to make adjustments to the position of the mounting plate 275 and therefore the pre-load on the spring, thereby adjust the damping profile of the damper. Furthermore, it is possible to provide the damper with a separate flow circuit having an adjustment mechanism, including, for example, a knob or lever, with various settings. In one setting, the damping profile of the damper is primarily controlled by the spring, as described herein. In a second setting, a flow path can be opened or created that bypasses the spring and allows fluid flow across the piston through a more conventional compression damping control, for example, conventional shims or a bypass orifice. In other words, the general concepts of the invention can be combined with other damping circuits if desired and can be made externally adjustable. Furthermore, the compression circuit according to the invention may be incorporated into a base valve or stationary partition (rather than shaft-mounted movable partition/piston).

In summary, according to the various exemplary embodiments of the invention, a fluid damper is provided that has a setting for producing a compression damping profile that is favorable for damping both low- and high-speed compressions, but does not require: (1) both low- and high-speed compression circuits; (2) the rider or a complicated control system to make adjustments to the compression circuit to achieve the different compression damping curves/profiles; and/or (3) the use of an inertia valve. In particular, the exemplary embodiments of the damping circuit described herein may provide, for example, a regressive damping profile across substantially the entire high-speed operating range of the damper.

While the invention has been disclosed with reference to certain exemplary embodiments and features, the scope of the invention shall only be defined by the appended claims.

| REFERENCE NUMERALS USED | |
|---|---|
| C | compression flow path |
| R | rebound flow path |
| R' | rebound bypass flow path |
| 100 | damper |
| 101 | damper housing |
| 105 | first tube |
| 106 | second tube |
| 110 | first variable volume fluid chamber |
| 115 | shaft |
| 116 | bolt |
| 116a, 116b | bolt head |
| 116' | bolt shank |
| 117 | spacer |
| 120 | second variable volume fluid chamber |
| 130 | rebound damping control shaft |
| 131 | knob |
| 132 | seat |
| 133 | rebound bypass check valve |

| REFERENCE NUMERALS USED | |
|---|---|
| 155 | partition |
| 160 | flow port (rebound) |
| 162 | check valve |
| 200 | flow control valve |
| 250 | flow port (compression) |
| 255 | spring |
| 255a | raised open center (of spring) |
| 255b | rim (of spring) |
| 260 | valve plate |
| 270 | spacer |
| 275 | mounting plate |
| 295 | adjustment mechanism |

That which is claimed:

1. A fluid damper configured for adjusting damping provided by said fluid damper based upon a speed of travel of a shaft within said fluid damper, said fluid damper comprising:
   a partition having a plurality of flow ports formed therethrough, said plurality of flow ports comprising:
      a plurality of kidney-shaped flow ports; and
      a rebound port;
   a cylindrical valve plate movably disposed proximate said partition such that said cylindrical plate provides a resistance to fluid flow through said plurality of flow ports, and said resistance to said fluid flow through said plurality of flow ports varies based on a distance of said cylindrical valve plate from said partition;
   a pre-loaded spring comprising an available spring travel/thickness ratio greater than 3;
   a mounting plate coupled with said pre-loaded spring, said mounting plate applying pressure upon said cylindrical valve plate via said pre-loaded spring,
   wherein said cylindrical valve plate is biased towards said partition by said pre-loaded spring, said cylindrical valve plate disposed at a first position with respect to said partition at a first speed of travel of said shaft, said cylindrical valve plate disposed at a second position with respect to said partition at a second speed of travel of said shaft, said second speed of travel of said shaft greater than said first speed of travel of said shaft, said first position being closer to said partition than said second position, said fluid damper providing a first damping force with said cylindrical valve plate disposed at said first position and said fluid damper providing a second damping force with said cylindrical valve plate disposed at said second position wherein said second damping force is non-increasing as said speed of travel of said shaft increases above a low speed operating range for said speed of travel of said shaft; and
   an adjustment mechanism coupled with said cylindrical valve plate, said adjustment mechanism configured for, upon manual manipulation of said adjustment mechanism, adjusting a preload value of said pre-loaded spring, said adjustment mechanism configured to adjust said preload value of said pre-loaded spring to a value such that said pre-loaded spring in combination with said partition, said cylindrical valve plate, and said mounting plate produces a damping profile suited to both high speed compression and low speed compression without requiring multiple compression circuits, without requiring complex user adjustments to said fluid damper, and without requiring the use of an inertia valve.

2. A fluid damper configured for adjusting damping provided by said fluid damper based upon a speed of travel of a shaft within said fluid damper, said fluid damper comprising:
   a partition having a plurality of flow ports formed therethrough, said plurality of flow ports comprising:
      three kidney-shaped flow ports; and
      a rebound port;
   a cylindrical valve plate movably disposed proximate said partition such that said cylindrical plate provides a resistance to fluid flow through said three kidney-shaped flow ports, and said resistance to said fluid flow through said three kidney-shaped flow ports varies based on a distance of said cylindrical valve plate from said partition;
   a pre-loaded Belleville spring comprising an available spring travel/thickness ratio of approximately 5;
   a mounting plate coupled with said pre-loaded Belleville spring, said mounting plate applying pressure upon said cylindrical valve plate via said pre-loaded Belleville spring;
   wherein said cylindrical valve plate is biased towards said partition by said pre-loaded Belleville spring, said cylindrical valve plate disposed at a first position with respect to said partition at a first speed of travel of said shaft, said cylindrical valve plate disposed at a second position with respect to said partition at a second speed of travel of said shaft, said second speed of travel of said shaft greater than said first speed of travel of said shaft, said first position being closer to said partition than said second position, said fluid damper providing a first damping force with said cylindrical valve plate disposed at said first position and said fluid damper providing a second damping force with said cylindrical valve plate disposed at said second position wherein said second damping force is non-increasing as said speed of travel of said shaft increases above a low speed operating range for said speed of travel of said shaft; and
   an adjustment mechanism coupled with said cylindrical valve plate, said adjustment mechanism configured for, upon manual manipulation of said adjustment mechanism, adjusting a preload value of said pre-loaded spring, said adjustment mechanism configured to adjust said preload value of said pre-loaded spring to a value such that said pre-loaded spring in combination with said partition, said cylindrical valve plate, and said mounting plate produces a damping profile suited to both high speed compression and low speed compression without requiring multiple compression circuits, without requiring complex user adjustments to said fluid damper, and without requiring the use of an inertia valve.

* * * * *